(12) United States Patent
Hennessy et al.

(10) Patent No.: US 6,235,234 B1
(45) Date of Patent: May 22, 2001

(54) DEVICE AND METHOD FOR ENHANCING ZINC YIELD FROM DROSS

(75) Inventors: Ann J. Hennessy, Pittsburgh; Herbert Lemper, McMurray, both of PA (US)

(73) Assignee: International Zinc Co., Pittsburgh, PA (US)

( * ) Notice: Subject to any disclaimer, the term of this patent is extended or adjusted under 35 U.S.C. 154(b) by 0 days.

(21) Appl. No.: 09/412,884

(22) Filed: Oct. 5, 1999

Related U.S. Application Data
(60) Provisional application No. 60/103,082, filed on Oct. 5, 1998.

(51) Int. Cl.[7] ........................................ C22B 7/04
(52) U.S. Cl. ....................... 266/44; 266/205; 266/228
(58) Field of Search ...................... 266/205, 44, 45, 266/227, 228

(56) References Cited

U.S. PATENT DOCUMENTS

| | | | |
|---|---|---|---|
| 3,198,505 | * 8/1965 | Amdur et al. | ........................ 266/228 |
| 3,770,132 | 11/1973 | Quast et al. . | |
| 3,843,355 | 10/1974 | Reding . | |
| 3,941,360 | 3/1976 | Blank . | |
| 4,003,559 | 1/1977 | Kuwano et al. . | |
| 4,007,119 | 2/1977 | Antonevich . | |
| 4,057,232 | 11/1977 | Rosa et al. . | |
| 4,165,866 | 8/1979 | Hetra, Jr. et al. . | |
| 4,269,398 | 5/1981 | Hogan et al. . | |
| 4,386,958 | 6/1983 | Tyler et al. . | |
| 4,460,166 | 7/1984 | Ritchie et al. . | |
| 4,540,163 | * 9/1985 | van Linden et al. | ................. 266/227 |
| 5,051,180 | * 9/1991 | Williams | .............................. 266/228 |

FOREIGN PATENT DOCUMENTS

| | | |
|---|---|---|
| 28 42 742 | 4/1980 | (DE) . |
| 2 128 520 | 5/1984 | (GB) . |
| 5 211 6722A | 9/1977 | (JP) . |
| 5-302157 | 11/1993 | (JP) . |
| 10 317120 | 12/1998 | (JP) . |

* cited by examiner

*Primary Examiner*—Scott Kastler
(74) *Attorney, Agent, or Firm*—Buchanan Ingersoll (57) ABSTRACT

A device for removing dross from the surface of the molten metal and for extracting usable elemental metal from the dross. The device comprises a container in which the dross is collected, a means for lifting the container out of the molten bath of metal and an agitating means for chopping the dross to separate the elemental metal from the particles of metal oxides contained in the dross. Preferably, the container has perforations therein such that the elemental metal may drain through the perforations and back into the molten bath. The remaining dross is then dumped in a recycle bin by the device.

41 Claims, 14 Drawing Sheets

DEVICE AND METHOD FOR ENHANCING ZINC YIELD FROM DROSS

RELATED APPLICATIONS

This application claims the benefit of U.S. Provisional Application No. 60/103,082, filed Oct. 5, 1998.

FIELD OF THE INVENTION

This invention relates to the recycling of dross formed in galvanizing processes, and particularly to a method and apparatus for removing dross from a vessel of molten zinc in a manner such that the zinc concentration remaining in the dross is minimized.

BACKGROUND OF THE INVENTION

In the galvanizing art, practitioners have long combated the formation of dross on the tops of the vessels of molten zinc. Dross is a skim which forms on the top of a bath of molten metal and, in the case of zinc, consists of a mush-like mixture of iron, aluminum and zinc intermetallic particles, oxide skims and liquid zinc alloy. The dross consists of about 96% zinc and 2% each of aluminum and iron. The dross is frequently removed for processing to prevent fouling the surface of the galvanizing strip product and to recover the zinc retained in the dross.

Even most contemporary procedures for removing dross in galvanizing and other molten metal processes are relatively crude, generally labor-intensive and dangerous for the operators of the removal apparatus. The removal process generally consists of having an operator use a long-handled paddle or rake to skim the surface of the molten bath. The dross is then scooped into a nearby mold.

Some of the apparatus and processes proposed in the past have numerous moving parts which are prone to breakdowns in the hostile environment of the galvanizing plant. Examples of apparatus having numerous parts are the mechanical skimmers disclosed in U.S. Pat. No. 3,941,360 to Blank, U.S. Pat. No. 4,165,866 to Hetra, et al., and U.S. Pat. No. 4,007,119 to Antonevich. Mechanical skimmers are still not used in many facilities because of various shortcomings in their design and because the process does not lend itself well to automation.

Various prior art workers have observed that, while galvanizing dross typically contains considerable amounts of zinc, the zinc tends to drain back into the vessel if the dross is contained in a temporary enclosure. Typically the temporary enclosure has perforations or other holes in it to permit the zinc to drain back into the main body of molten metal. An illustration of such an enclosure similar to that sometimes used in the galvanizing art is the one shown by Reding in U.S. Pat. No. 3,843,355, said to be specifically for the magnesium purifying art. See also the temporary enclosure or "flotation box" of Tyler, et al. shown in U.S. Patent No. 4,386,958.

In U.S. Patent No. 4,003,559, Kuwano, et al. note that a common practice in the art has been to agitate the dross manually to hasten the coalescing of the zinc droplets or particles, to drain zinc from the dross. We have found that since the manual agitation of the dross is difficult and dangerous to perform, it is seldom performed efficiently, resulting in a high concentration of useable zinc remaining in the dross for recovery in a remote location rather than directly into the molten bath. Kuwano, et al. go on to suggest the use of a plurality of "scrape plates" for mechanical, rather than manual, agitation of the dross. The scrape plates are disposed within a container which is separate from the main metal bath. The container has perforations or holes for draining coalesced metal.

SUMMARY OF THE INVENTION

Our invention is an apparatus for assisting the operator of a dross removal process. It results in a dross having less usable zinc therein, less likelihood of injury on the job, and a saving of labor.

The invention eliminates the most dangerous and difficult part of the dross removal operation the lifting of the dross-laden basket from the bath. This is accomplished by providing an apparatus which mechanically lifts the dross-laden basket out of the bath, rotates the basket away from the molten bath, and deposits the dross into a recycle box. Recycled dross is then sold as scrap. The lifting of the dross basket out of the molten bath and the rotating of the basket away from the molten bath is accomplished, in the preferred embodiment, by the use of an air or hydraulic cylinder, while the rotating of the basket to an inverted position to dump the dross into the recycle bin is accomplished by an air or hydraulic rotary actuator.

It is desirable to remove as much of the useable zinc from the dross as possible before depositing the dross in the recycle box. This can be accomplished to a large degree by compressing or "chopping" the dross, thereby separating the useable molten zinc from the undesirable waste products in the dross. The useable zinc is then returned to the molten bath for immediate use.

Our invention provides (a) a perforated basket for accumulating dross while permitting draining of molten zinc therefrom, (b) means for lifting the basket, containing dross, from the surface of a molten metal bath, (c) means for agitating the dross in the basket to enhance the draining of zinc from the dross in the basket, and (d) means for delivering the dross, containing minimal residual zinc metal, to a container external of the molten metal vessel.

DETAILED DESCRIPTION OF THE INVENTION

Figure 1:
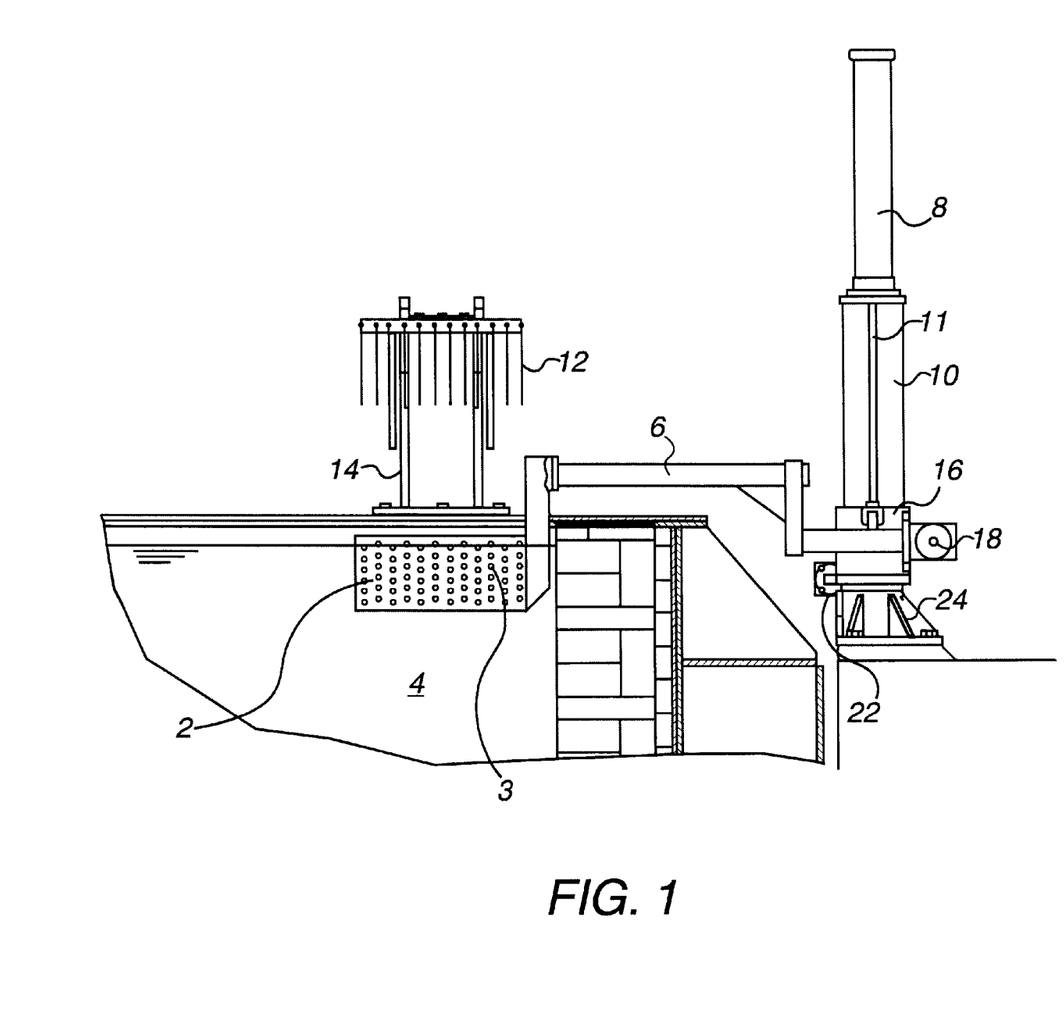
FIG. 1 is a side elevational view of the preferred embodiment of the apparatus, showing the initial position wherein the basket is submerged in the molten bath and available for receiving dross from the surface of the molten metal.
Figure 2:
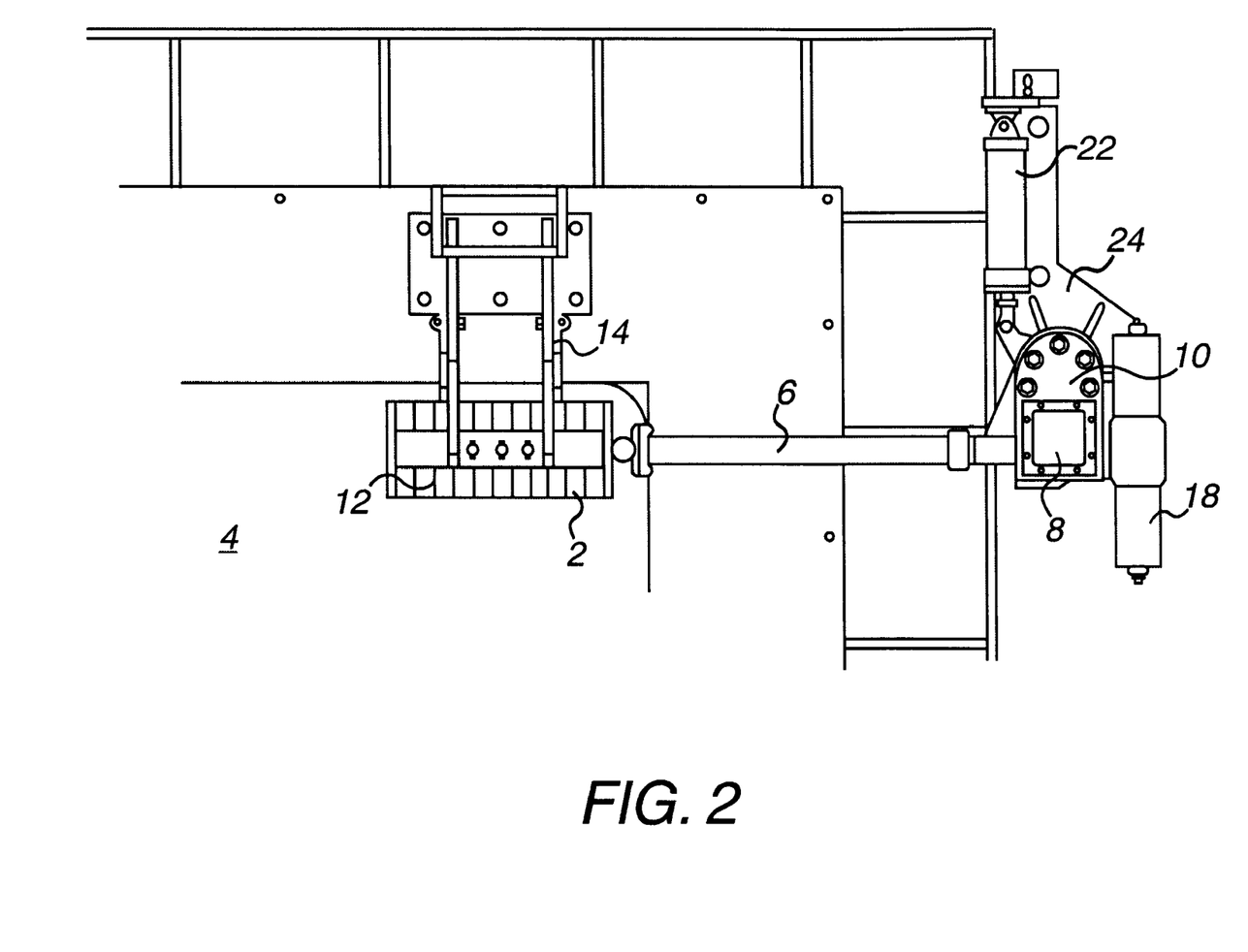
FIG. 2 is a top view of the preferred embodiment with the basket positioned above the molten bath.

Referring now to FIG. 1, showing the preferred embodiment of the invention, basket 2 is suspended in molten bath 4 by arm 6, which is able to slide in a vertical direction up and down upright 4. Basket 2 is suspended at a level wherein it is substantially immersed in molten bath 4. The top of basket 2 is open so an operator can rake or skim dross from the surface of molten bath 4 into basket 2. Frequently, this will mean that the actual level of the material within the confines of basket 2 will be slightly higher than the level of molten bath 4; nevertheless, the operator can continue to pass dross into basket 2 because coalesced molten material, such as molten zinc, passes through perforations in basket 2 to drain through and reenter molten bath 4, even while basket I is suspended in molten bath 2.

Basket 2 is preferably rectangularly-shaped at the top with sloped sides and a rounded bottom, but may generally be of any desired shape and configuration. The shape of the preferred embodiment of basket 2 facilitates the removal of the dross therefrom, because there are a minimum number of corners within basket 2 in which the dross may become stuck. In the preferred embodiment, basket 2 is 10" wide, 24" long and 10" deep.

The body of basket 2 is covered with perforations 3. It has been found that the size and spacing of perforations 3 affects the performance of the apparatus and the amount of elemental zinc which can be recovered from the dross. In the preferred embodiment, perforations 3 consist of ¼" diameter round holes spaced ¾" apart on their centers and arranged in rows. The rows of holes are staggered. It has been found that if the holes are too small, the amount of elemental zinc that can be extracted from the dross is inhibited and the holes may become clogged with oxidized metal. Conversely, if the holes are too big, undesirable particles of oxidized metal will escape from basket 2. Holes having a diameter of between ⅛" to ¾" and spacing from ⅜" to 1½" are acceptable. The preferred measurements of perforations 3 work well when used with zinc; holes of other sizes and spacing may be optimal when the apparatus is used with other metals. Although round perforations are preferred, the perforations may be of any shape and need not be arranged in rows.

Basket 2 may optionally be supplemented with a ramp 5 along one lip of the opening thereof. Ramp 5 should slope downward into the molten metal at a slight angle to facilitate the raking of the dross into basket 2 by the operator. The angle at which ramp 5 slopes downwardly from the lip of basket 2 should not exceed about 30°. Ramp 5 can best be seen in FIGS. 5 and 6. Although the preferred embodiment of the basket has been described, baskets of varying shapes and sizes may be utilized. Additionally, perforations of varying shapes, sizes and spacing may also be utilized.

The apparatus is preferably designed to be adaptable to various bath configurations and dimensions. Accordingly, arm 6 is jogged in the middle to accommodate the side wall of molten bath 4 when basket 2 is suspended within the molten metal. Upright 10 is mounted on base 24 which is easily installed as by bolting to the floor adjacent to molten bath 4. Basket 2 is lifted from molten bath 4 by lifting cylinder 8, which is connected to sleeve 16 via piston 11. Lifting cylinder 8 may be an air or hydraulic cylinder or any other mechanism known in the art to provide the proper motion required for lifting basket 2 from molten bath 4; however, in the harsh environment in which the apparatus is to be used, the preferred embodiment utilizes an air cylinder for safety reasons. Lifting cylinder 8 allows the use of the apparatus with baths of various dimensions and heights. Sleeve 16 is coaxially mounted to upright 16 and slides vertically along the length thereof when lifting cylinder 8 is activated.

Basket 2 may be rotated away from molten bath 4 by rotating cylinder 22 to facilitate the deposit of the dross in recycle bin 20. The basket is shown in a rotated position in FIGS. 5 and 6. Rotating cylinder 22 is connected to upright 10 via piston 26, shown in FIG. 6. When rotating cylinder 22 is activated, the entire apparatus, except for base 24, is rotated such that basket 2 is suspended over recycle bin 20. Rotating cylinder 22 may, like lifting cylinder 8, be an air or hydraulic cylinder or another type of mechanism, but is preferably an air cylinder.

Basket 2 is inverted by rotating actuator 18 which imparts a rotating motion to arm 6 and therefore basket 2. Rotating cylinder 18 may be any type of mechanism known in the art to provide the required rotating motion.

Integral to the operation of the apparatus are blades 12 which, in the preferred embodiment, are suspended from mount 14 directly over the position of basket 2 in molten bath 4. Mount 14 may be attached, as by bolting, directly to the side wall of molten bath 4. In operation, blades 12 are inserted into basket 2 and brought into contact with the dross contained therein. The blades chop the dross into smaller pieces, freeing elemental zinc from the oxidized metal, thereby allowing the elemental zinc to escape basket 2 through perforations 3 while particles of oxidized metal are trapped therein.

Blades 12 preferably consist of a plurality of stiff metal strips held in a parallel relationship to each other. In the preferred embodiment, blades 12 are of the same shape as the cross sectional shape of basket 2. As such, when blades 12 are inserted into basket 2, the maximum amount of dross may be contacted by the blades. It has been found that the spacing of the blades is important to the performance of the apparatus. If the blades are too close to each other, the dross has a tendency to get stuck therebetween. If the blades are too far apart, not enough chopping action is provided, and the amount of elemental zinc that can be extracted from the dross is reduced. In the preferred embodiment, blades 12 are positioned approximately 2" from each other, however, blades positioned between 1" and 3" from each other should be acceptable.

Blades 12 may be positioned anywhere within the range of motion of arm 6 and basket 2, but are preferably positioned directly above molten bath 4. This positioning of the blades is convenient because the elemental zinc which drains from basket 2 falls directly back into molten bath 4. Additionally, this position minimizes the time interval between the time when basket 2 is removed from molten bath 4 and the time when blades 12 are inserted into basket 2. As a result, any zinc remaining with basket 2 will not have a chance to re-solidify. If blades 12 are not positioned over molten bath 4, it will be necessary to provide another way for the zinc escaping from basket 2 to be returned to molten bath 4, such as a trough. Alternatively, the elemental zinc may be collected in a container separate from molten bath 4.

Figure 3:
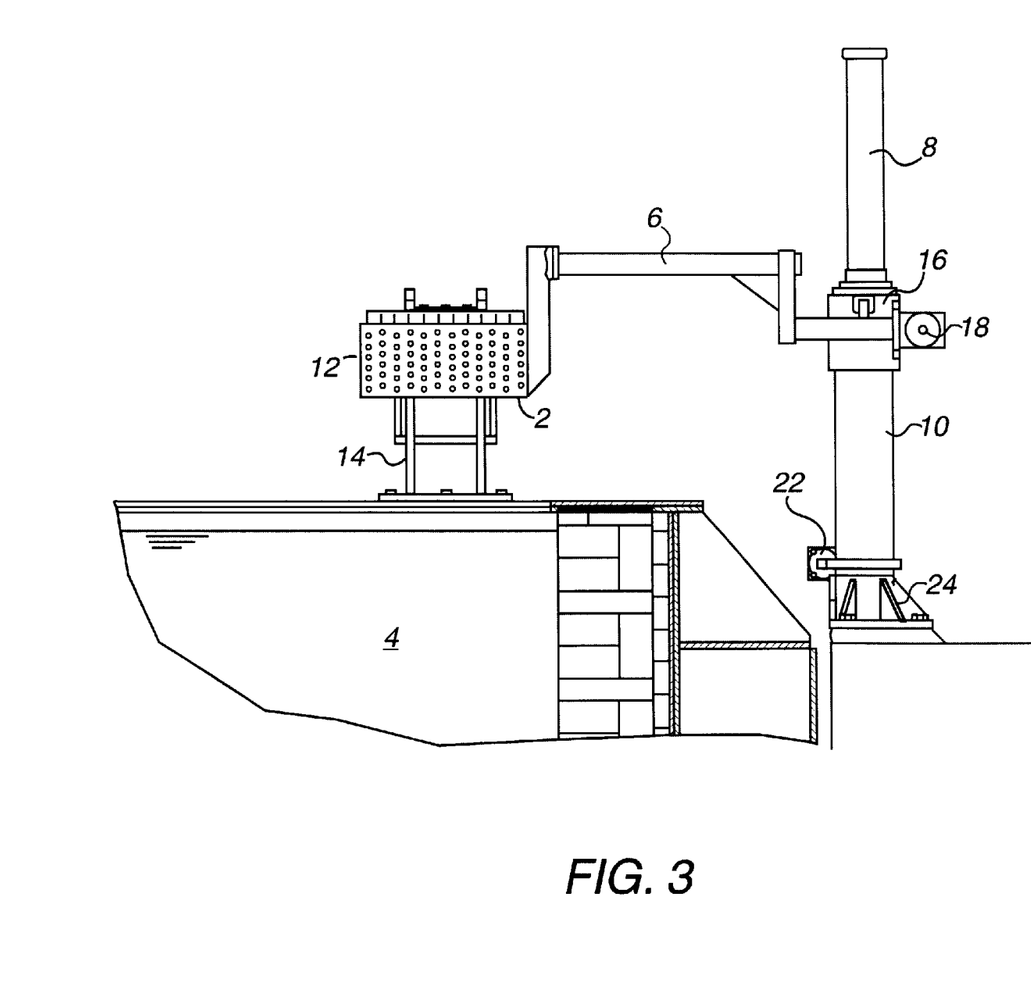
FIG. 3 is a side elevational view of the preferred embodiment, showing the dross-laden basket lifted out of the molten bath such that the blades are inserted into the basket.
Figure 4:
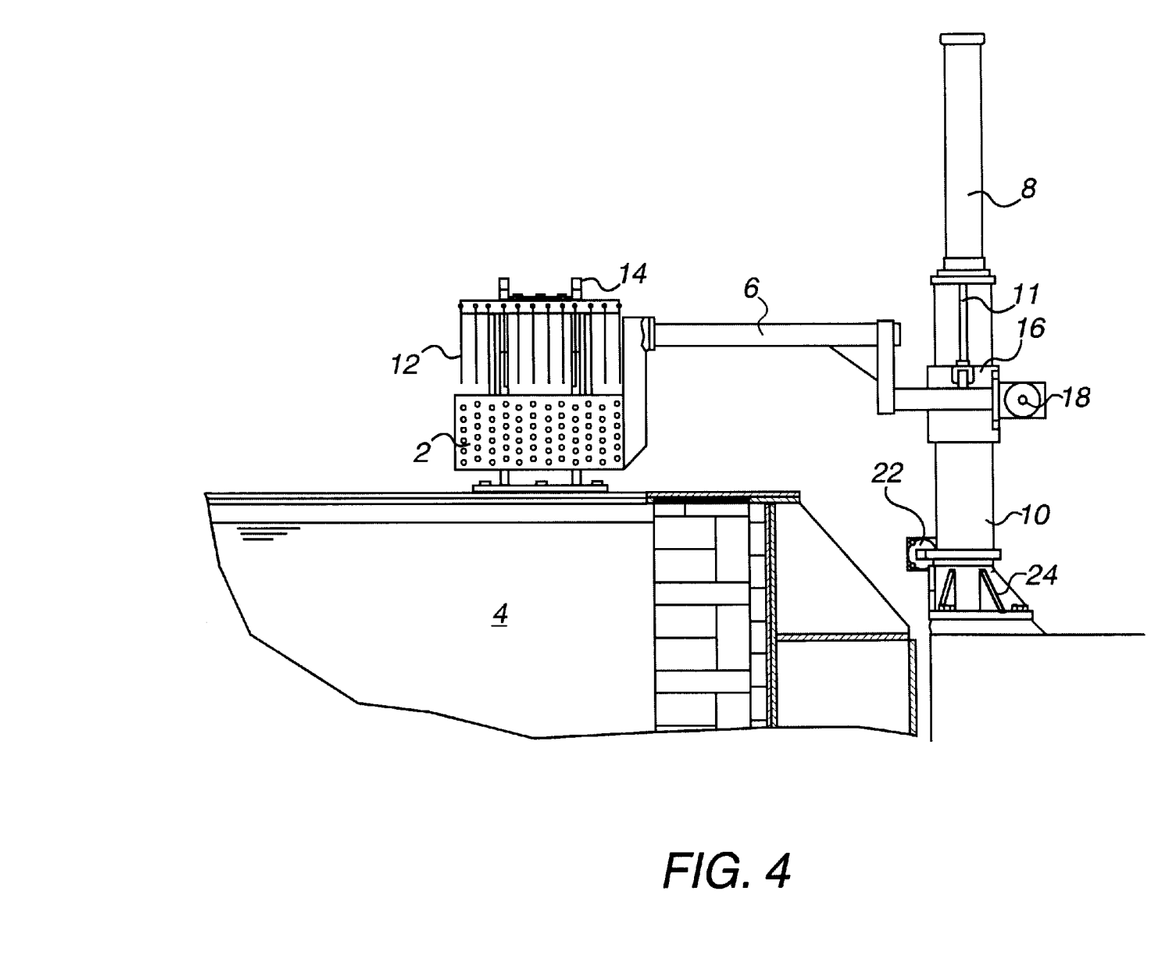
FIG. 4 is a side elevational view of the preferred embodiment, showing the basket in an intermediate position between the molten bath and the blades.

In operation, basket 2 begins in the position shown in FIG. 1, wherein basket 2 is suspended within molten bath 4 such that the lip of basket 2 is approximately even with the top of the molten metal. Ramp 5 will be slightly below the level of the molten metal. Dross is raked or scooped from the surface of the molten metal into basket 2 by an operator. When basket 2 is full of dross, lifting cylinder 8 is activated and basket 2 is lifted out of molten bath 4 and positioned, as shown in FIG. 3 such that blades 12 are inserted in basket 2. Preferably, from 75% to 90% of each of blades 12 will be inserted into basket 2. Basket 2 is then lowered to an intermediate position, shown in FIG. 4, and the process of inserting blades 12 into basket 2 is repeated. The raising and lower procedure is repeated preferably 4 to 5 times to provide the chopping action necessary to release the elemental zinc from the oxidized metal. Zinc will fall from basket 2 when blades 12 are inserted therein, and also when basket 2 abruptly reverses direction as it is lowered away from and raised toward blades 12. It has been found that inserting blades 12 4–5 times into basket 2 achieves the optimal results with the dimensions of the preferred embodiment. If the spacing of blades 12, the size of perforations 3, or any other dimensions were change, the number of insertions of blades 12 into basket 2 may need to be adjusted accordingly to achieve optimal results.

It may be noted here that the illustrated mechanism is preferred for its simplicity. Blades 12 remain more or less stationary and basket 2 is moved toward blades 12. Therefore, no separate mechanism is required to move blades 12. It is, however, within the scope of this invention to employ a reciprocating motion for basket 2 and blades 12 so that they will meet intermediate the original level of blades 12 and the original level of basket 2. In this case, basket 2 and/or blades 12 may be moved relative to each other several times to achieve the effect of the knives passing up and down in basket 2.

Figure 5:
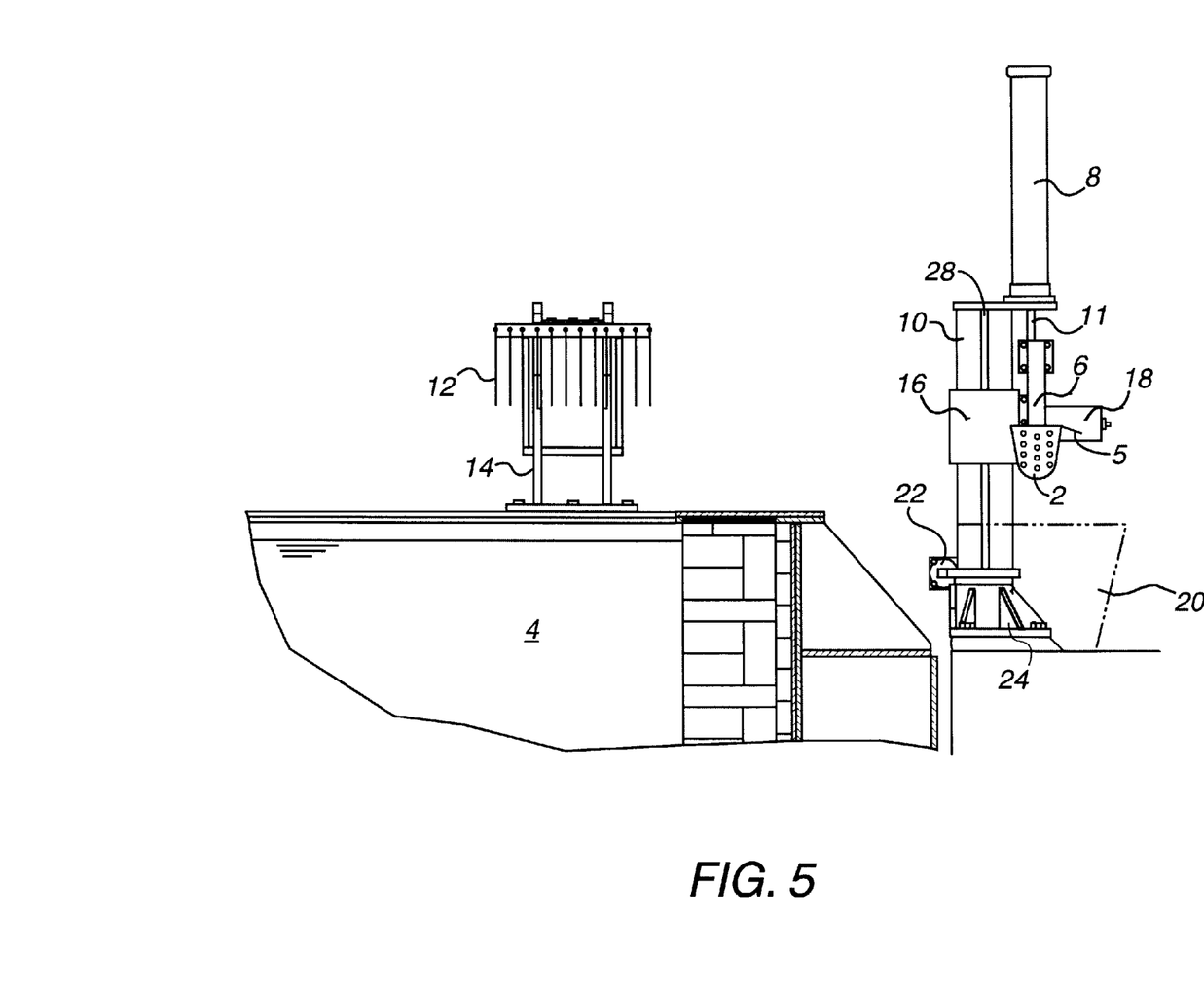
FIG. 5 is a side elevational view of the preferred embodiment, showing the basket rotated 90 degrees with respect to the molten bath, such that the basket is over the recycle bin.
Figure 6:
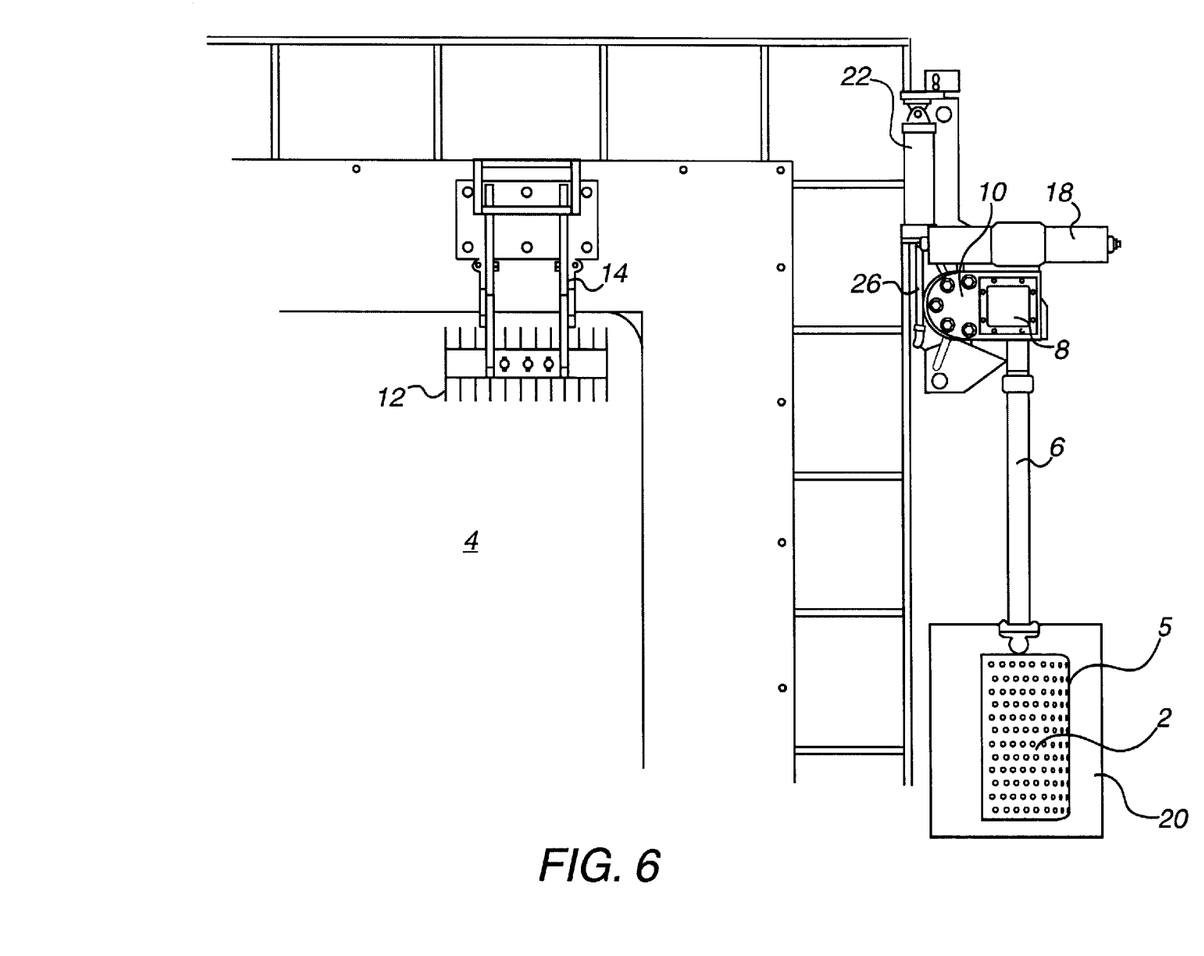
FIG. 6 is a top view of the preferred embodiment with the basket rotated 90 degrees away from the molten bath, such that it is positioned above the recycle bin.
Figure 7:
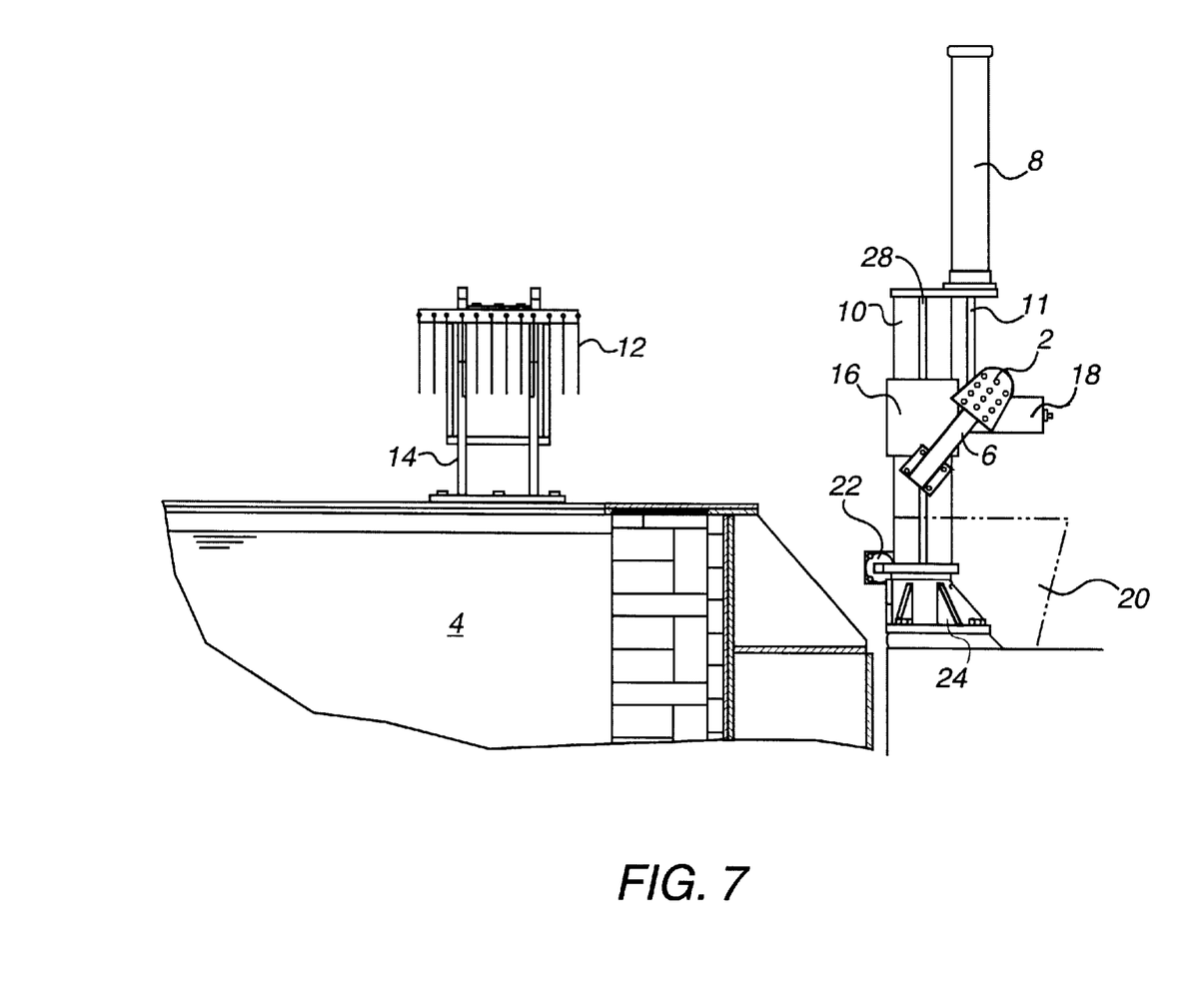
FIG. 7 is a side elevational view of the preferred embodiment showing the basket being rotated such that any dross remaining in the basket will be deposited into the recycle bin.
Figure 8:
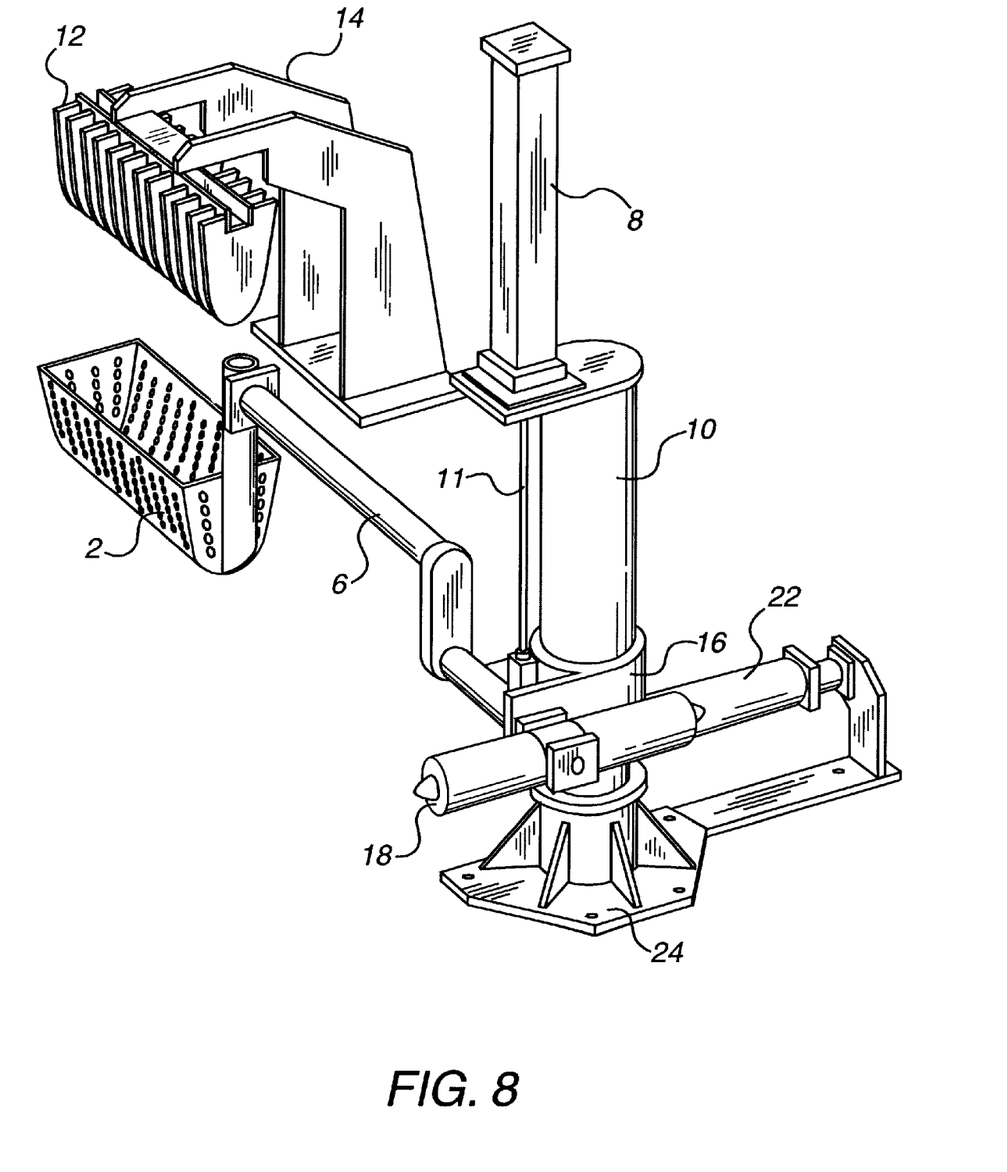
FIG. 8 is an isometric view of the preferred embodiment of the apparatus.

FIG. 5 shows basket 2 having been rotated away from molten bath 4. Basket 2 contains dross, now having a reduced zinc content, which must be placed in recycle bin 20. Basket 2 is rotated by rotating cylinder 22, which turns the entire apparatus about base 24. This rotating motion causes basket 2 to rotate away from molten bath 4 to a point above recycle box 20 such that the remaining dross can be dumped into recycle box 20. Once basket 2 is located above recycle box 20, rotating actuator 18 is activated which causes arm 6, and therefore basket 2, to rotate about an axis perpendicular to upright 10, thereby dumping its contents into recycle box 20. This position is shown in FIG. 7. Basket 2 may now be replaced in molten bath 4 for collection of additional dross.

To aid in the removal of dross from basket 2, basket 2 may optionally be heated to slow the re-solidification of the dross and zinc remaining therein. Preferably, the heating of basket 2 is done by embedding one or more electric heating coils in the walls of basket 2, however, the heating may be accomplished by any one of a variety of methods known to those of skill in the art, such as by the application of one or more gas burners to basket 2. It is desirable to keep basket 2 at a temperature approaching that of the molten bath, about 800° F. to 900° F. To further aid in the removal of the dross from basket 2, basket 2 may optionally be shaken or vibrated when in the inverted position shown in FIG. 7.

Figure 9:
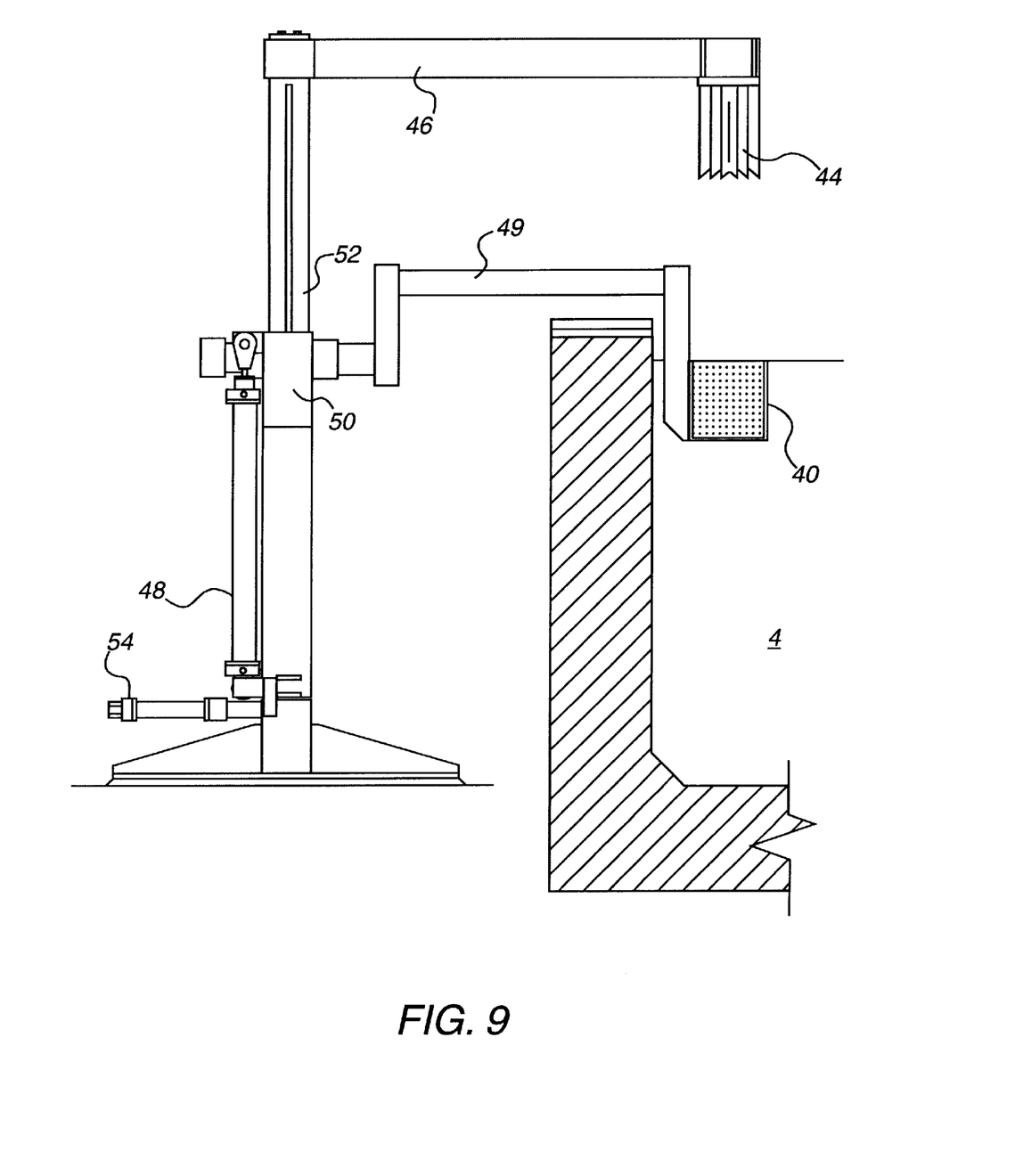
FIG. 9 is a side elevational view of an alternate embodiment of the apparatus, showing the initial position wherein the basket is submerged in the molten bath and available for receiving dross from the surface of the molten metal.
Figure 10:
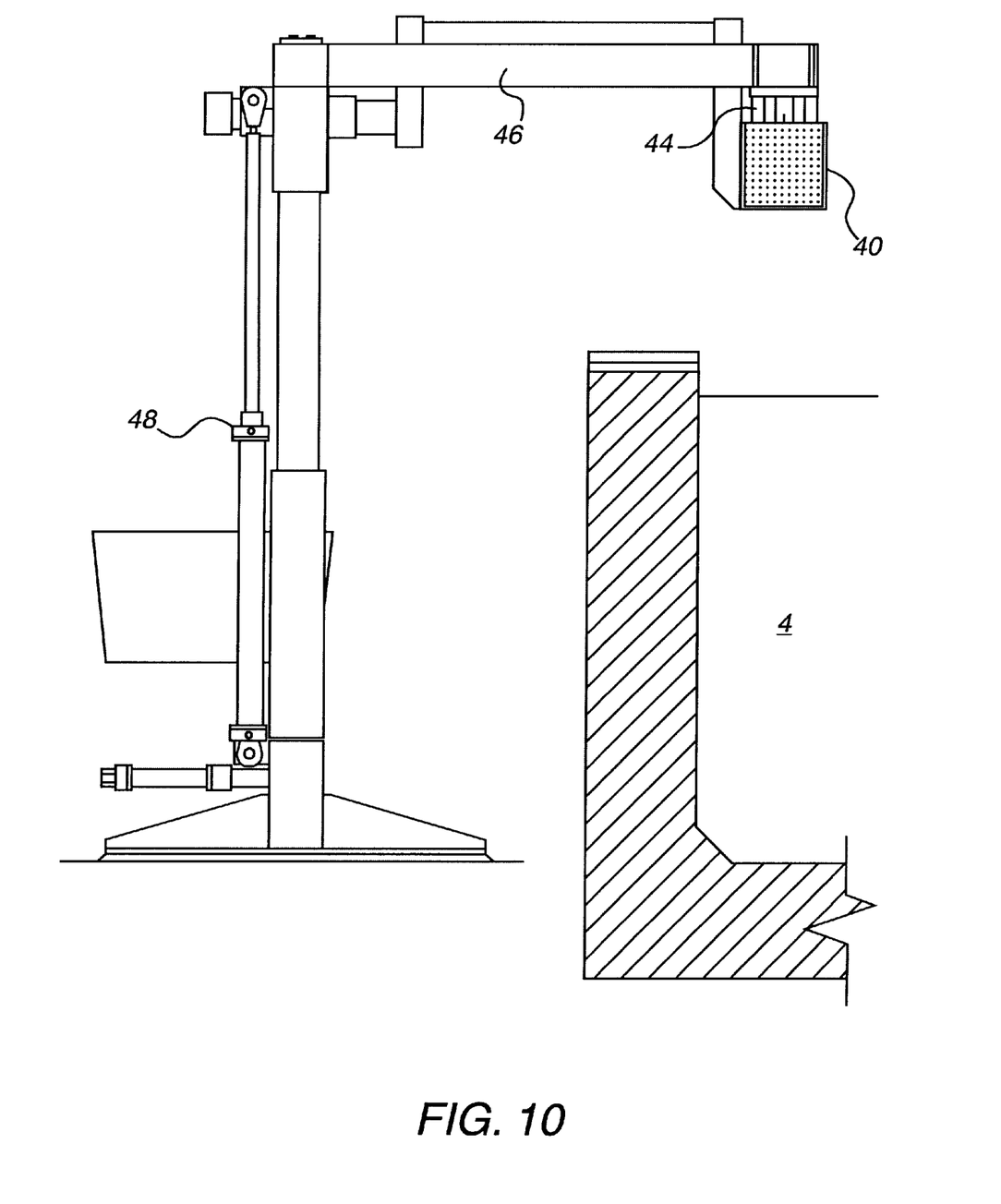
FIG. 10 is a side elevational view of an alternate embodiment of the apparatus showing the dross-laden basket lifted out of the molten bath such that the blades are inserted into the basket.
Figure 11:
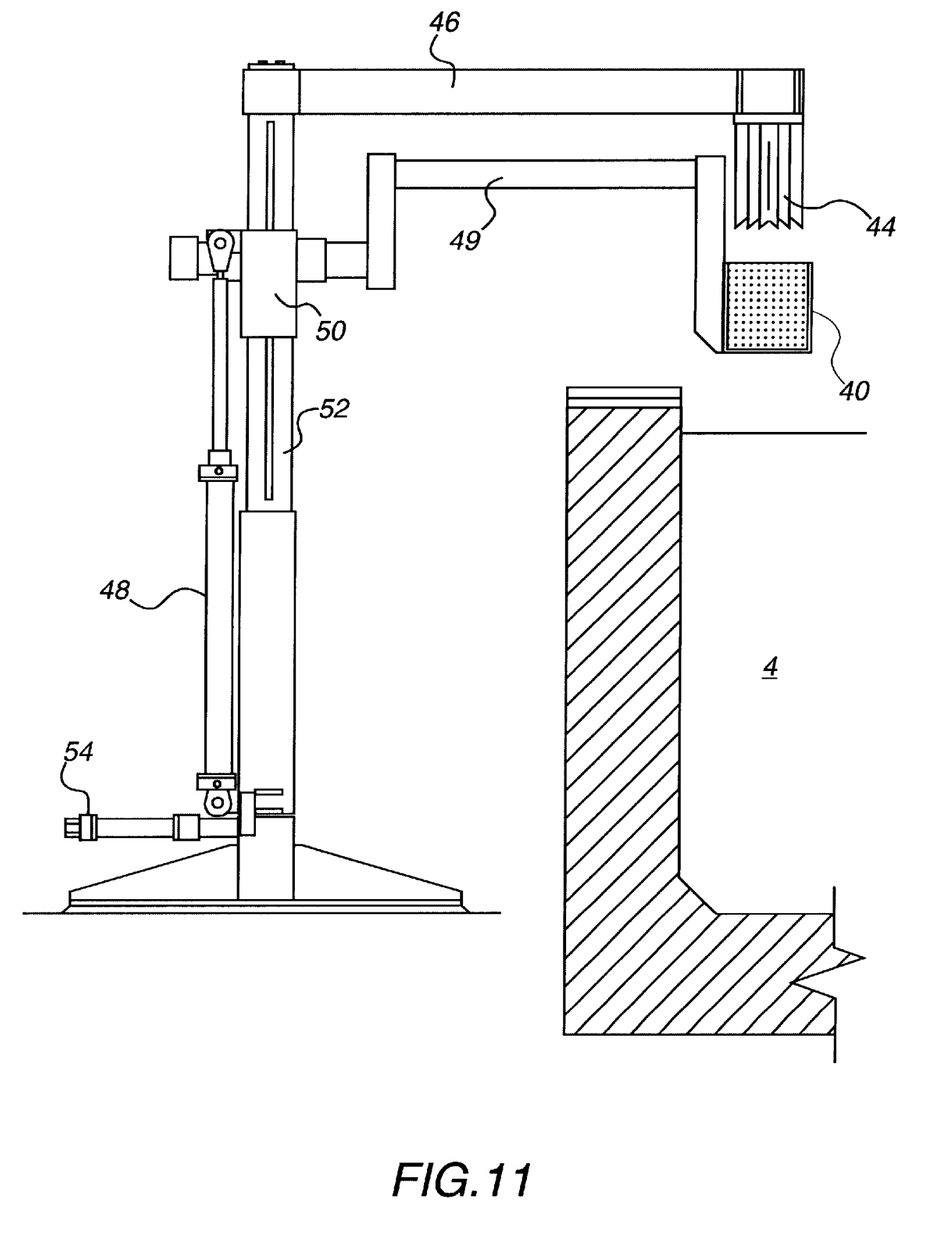
FIG. 11 is a side elevational view of an alternate embodiment, showing the basket in an intermediate position between the molten bath and the blades.
Figure 12:
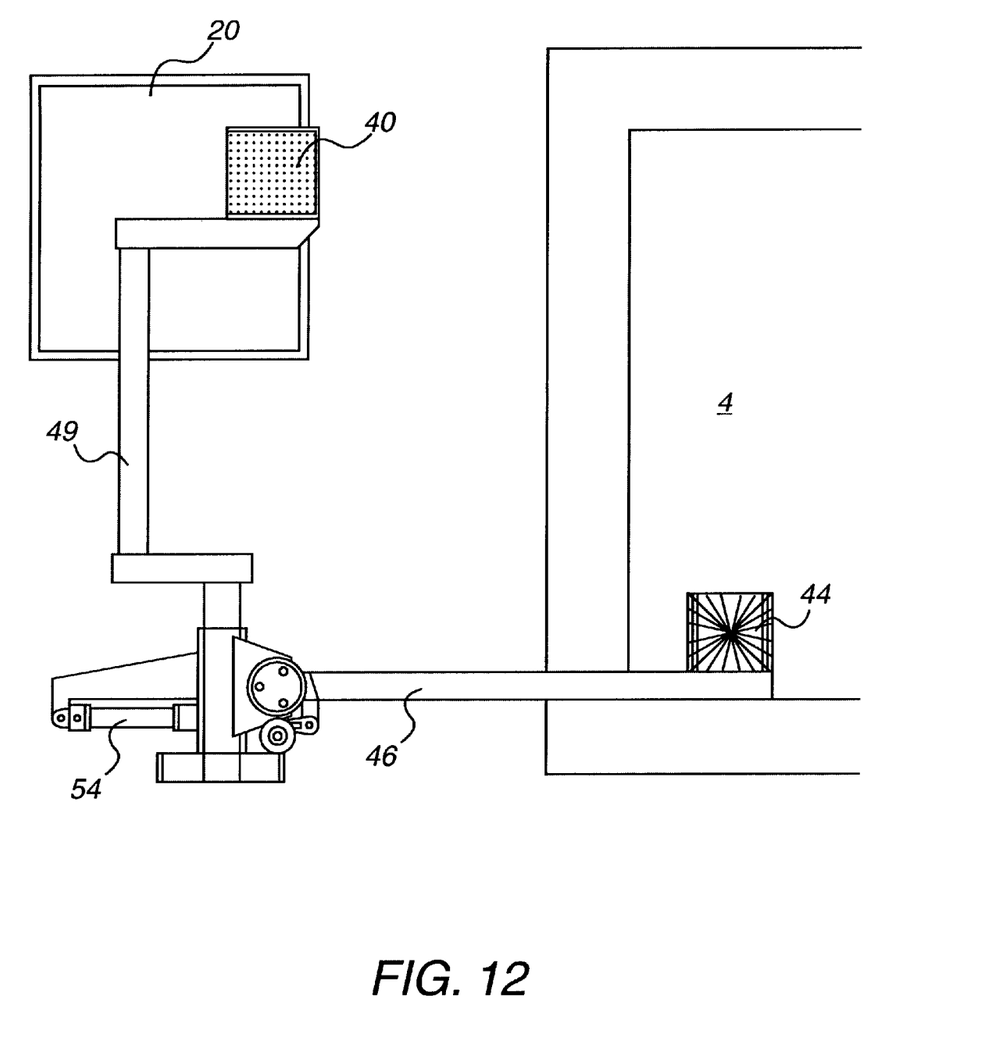
FIG. 12 is a top view of an alternate embodiment, showing the basket rotated 90 degrees with respect to the molten bath, such that the basket is over the recycle bin.

FIGS. 9–12 show an alternative embodiment of the current invention. In this alternative embodiment, it should be noted that blades 44 are suspended from arm 46 which is attached to top of the apparatus. The blades are shown as being positioned above molten bath 4, however, utilizing this configuration, it is possible that the blades could be located away from molten bath 4 and above a secondary container into which the elemental zinc will fall. FIG. 9 shows basket 40 lowered into molten bath 4. It should be noted that the shape of the basket and the shape of blades 44 are different in this embodiment. Blades 44 consist of a collection of pointed pieces of metal which do not conform in shape to the cross sectional shape of basket 40. This arrangement will, however, work in a manner similar to the preferred embodiment in that the dross will be chopped by the blades, thereby freeing the elemental zinc from the metal oxide and allowing it to fall through the perforations in basket 40.

The alternative embodiment also shows a different mechanism for raising and lowering basket 40 from molten bath 4. The mechanism consists of lifting cylinder 48 which lifts sleeve 50 along upright 52. Sleeve 50 is connected to basket 40 via arm 49. Also, in this embodiment, when basket 40 is rotated away from molten bath 4, rotating actuator 54 will rotate lifting cylinder 48 and sleeve 50, which in turn causes arm 49 and basket 40 to rotate until it is positioned above recycling bin 20.

Figure 13:
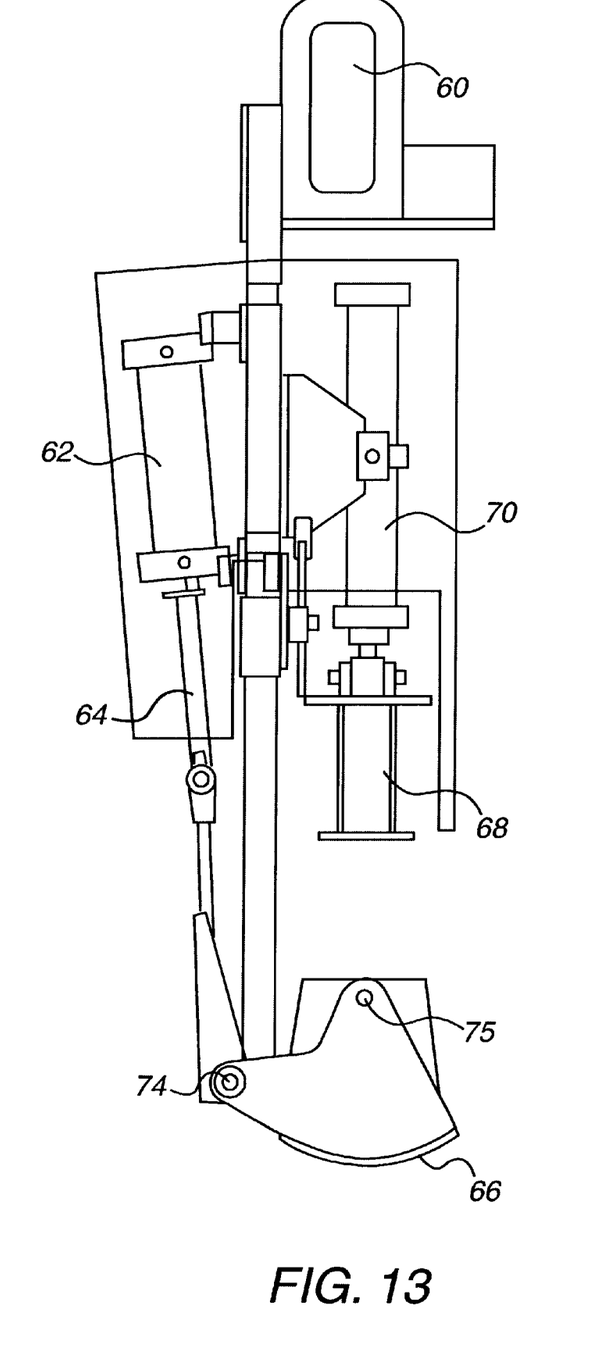
FIG. 13 shows a second alternate embodiment of the apparatus which hangs from a crane suspended above the molten bath.
Figure 14:
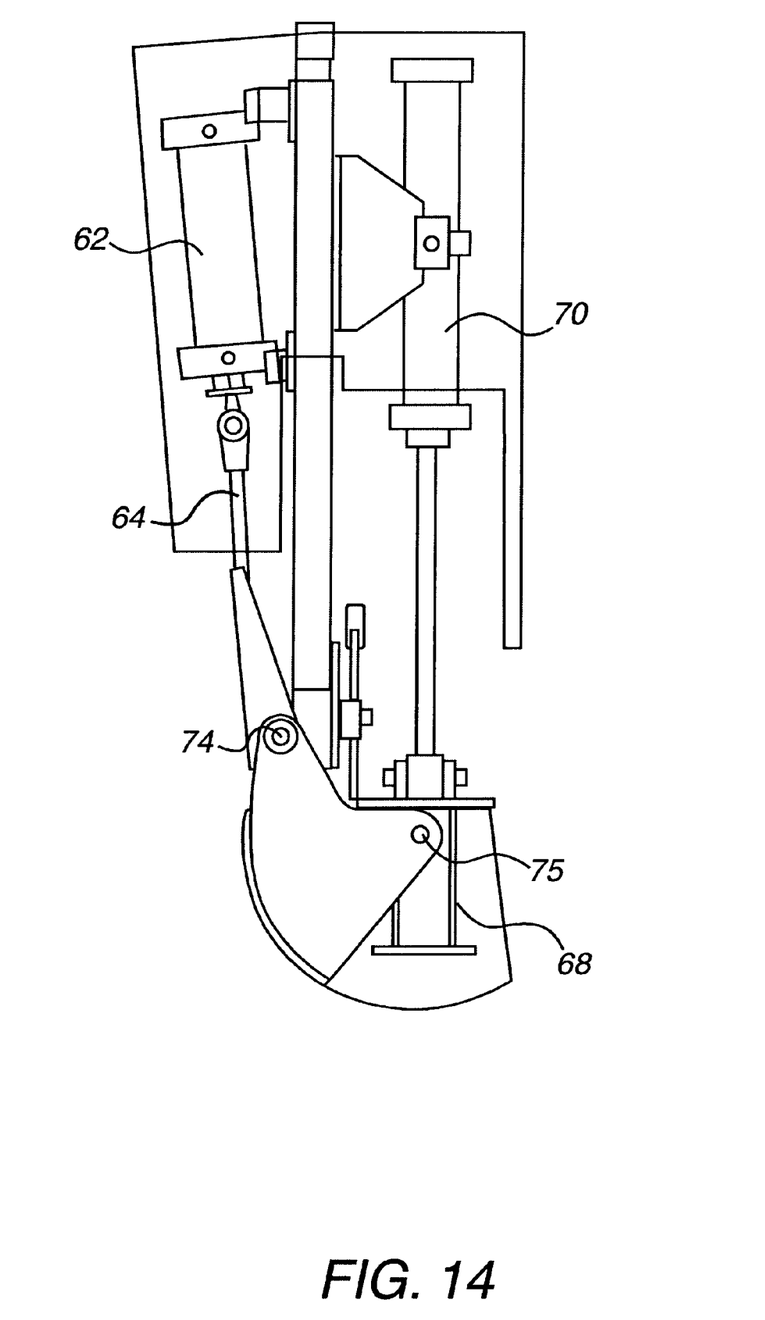
FIG. 14 shows the second alternate embodiment of the apparatus wherein the basket has been lifted out of the molten bath.

FIGS. 13 and 14 show yet another possible embodiment of the current invention. This embodiment is meant to be suspended from an overhead crane (not shown) which would hook into opening 60 to suspend the entire mechanism over the molten bath. This embodiment is notable in that the blades have been replaced by push plug 68, which is a solid, hammer-like mechanism which crushes the dross, thereby squeezing elemental zinc from the particles of oxidized metal, causing the elemental zinc in the collected dross to run out the perforated bottom of basket 66. In this embodiment, push plug 68 is moved into basket 66 via cylinder 70 and piston 72. Basket 66 is rotated about pivot 74 and 75 via cylinder 62 and piston 64 to dump the zinc-depleted dross from basket 66 after the overhead crane has moved the mechanism into position over recycle bin 20.

FIG. 14 illustrates cylinder arm 72 extended from cylinder 70, sending push plug 68 into basket 66. Basket 66 in this view has been lifted by cylinder 62 into the dumping position for removal of the dross remaining after push plug 68 has pushed the dross to assist the coalescing and draining of the metallic zinc through the bottom of basket 66.

It should be noted that, although all embodiments of this invention and the process described for their use is intended for use with zinc, it can also be applied to processes involving aluminum, magnesium, or any other light metal that produces a top dross or skimming.

Although a preferred and alternate embodiments have been disclosed herein, it is to be understood that a variety of configurations may be utilized by one of skill in the art that are still within the scope of the invention, which is defined solely by the following claims.

We claim:

1. An apparatus for removing dross from the surface of a molten metal bath while reducing the content of molten metal in said dross comprising:
   a container for receiving dross from said surface of said molten metal;
   a lifting member positioned to raise said container, containing dross, from said molten metal bath;
   an agitating member comprising a plurality of blades arranged in parallel, said agitating member positioned to be inserted into said container and capable of contacting said dross with a chopping action to enhance the draining of said molten metal therefrom; and
   an actuator for positioning said container such that said dross can be deposited outside of said molten metal bath.

2. The apparatus of claim 1 wherein said container consists of a bottom and a plurality of sides extending from said bottom to define an open top, said bottom and said plurality of sides defining a plurality of perforations.

3. The apparatus of claim 1 wherein said agitating member consists of one or more blades.

4. The apparatus of claim 1 wherein said lifting member comprises a hydraulic or pneumatic cylinder and piston assembly.

5. The apparatus of claim 2 wherein said agitating member consists of one or more blades.

6. The apparatus of claim 2 wherein said lifting member comprises a hydraulic or pneumatic cylinder and a piston.

7. The apparatus of claim 5 wherein said lifting member comprises a hydraulic or pneumatic cylinder and a piston.

8. The apparatus of claim 6 wherein said agitating member consists of one or more blades.

9. The apparatus of claim 7 wherein said perforations are round holes having a diameter between one eighth of an inch and three fourths of an inch.

10. The apparatus of claim 9 wherein said diameter of said perforations is one quarter of an inch.

11. The apparatus of claim 7 wherein said agitating member is stationary and wherein said lifting member is capable of lifting said container such that said agitating member is inserted therein.

12. The apparatus of claim 7 wherein said perforations are spaced between three eighths of an inch and one and one half inches from each other.

13. The apparatus of claim 12 wherein said perforations are spaced three quarters of an inch from each other.

14. The apparatus of claim 7 wherein said perforations have a diameter of one quarter inch and wherein said perforations are spaced three quarters of an inch from each other.

15. The apparatus of claim 14 wherein said perforations are arranged into rows and wherein every other row is staggered such that said perforations in any row are offset from perforations in any adjacent row.

16. The apparatus of claim 2 where said container is rectangular in overall shape, having two long sides and two short sides.

17. The apparatus of claim 16 wherein said short sides of said container are approximately ten inches in length, said long sides of said container are approximately twenty-four inches in length and wherein said container is ten inches deep.

18. The apparatus of claim 16 further comprising a ramp connected to one of said long sides of said container adjacent to said open top and extending downwardly therefrom at an angle not exceeding thirty degrees.

19. The apparatus of claim 16 wherein said bottom of said container is convex.

20. The apparatus of claim 19 wherein said two long sides of said container are outwardly tapered from said bottom.

21. The apparatus of claim 8 wherein each of said one or more blades is sized and shaped to match a cross section of said basket.

22. The apparatus of claim 21 wherein said blades are parallel to each other and spaced at intervals of between one and three inches.

23. The apparatus of claim 22 where said blades are spaced two inches from each other.

24. The apparatus of claim 23 wherein said blades are downwardly-oriented.

25. The apparatus of claim 4 further comprising:
   a base; and
   a post, rotatably attached to said base.

26. The apparatus of claim 25 wherein said cylinder is connected to one of said post or said container and wherein said piston is connected to the other of said post or said container.

27. The apparatus of claim 25 wherein said actuator comprises a second hydraulic or pneumatic cylinder and piston assembly.

28. The apparatus of claim 27 wherein said second cylinder is connected to said one of said base or said post and wherein said second piston is connected to the other of said base or said post.

29. The apparatus of claim 25 wherein said container is connected to an arm and said arm is slideably connected to said post and wherein said arm is shaped to accommodate a side wall of said molten bath when said container is immersed into said bath.

30. The apparatus of claim 11 wherein said blades are inserted between 75% and 90% into said container.

31. The apparatus of claim 1 further comprising a rotary actuator positioned to rotate said container about a horizontal axis to an inverted position such that any dross contained in said container will fall therefrom.

32. The apparatus of claim 31 further comprising a shaking member to shake said container when said container is in said inverted position.

33. The apparatus of claim 2 further comprising a heating member coupled to said container such that said container is kept at an elevated temperature by said heating member.

34. The apparatus of claim 33 wherein said heating member comprises one or more electric coils embedded in one or more of said sides and bottom of said container.

35. The apparatus of claim 33 wherein said heating member comprises one or more gas burners producing flames which are directed to one or more of said sides and bottom of said container.

36. An apparatus for removing dross from the surface of a molten metal bath comprising:
   a base;
   a post, extending upwardly from said base and rotatably attached thereto;
   a sleeve, positioned coaxially with said post, such that said sleeve is able to slide up and down said post;
   a lifting member positioned to move said sleeve up and down said post;
   an linear actuator positioned rotate said post with respect to said base;
   an arm having two ends, connected to said sleeve on one end;
   a container, connected to said other end of said arm; and
   a rotary actuator for rotating said arm and said container about a horizontal axis.

37. A method of reducing the percentage of elemental metal in a dross comprising:

placing said dross on or above a perforated surface;

chopping said dross with a plurality of parallel blades to form coalesced moieties of said molten metal; and allowing said coalesced moieties of said molten metal to drain through said perforations.

38. The method of claim 37 wherein said agitating is performed beneath the upper level of said bath of said molten metal.

39. The method of claim 38 wherein said agitating is performed above the upper level of said bath of said molten metal.

40. The method of claim 39 further comprising the step of dumping said dross remaining above said perforated surface into a receptacle.

41. The method of claim 40 further comprising the step of shaking or vibrating said perforated surface to dislodge said dross therefrom.

* * * * *